(12) United States Patent
Burkhard et al.

(10) Patent No.: US 11,386,874 B2
(45) Date of Patent: Jul. 12, 2022

(54) SYSTEM FOR PERFORMING IMAGE STABILIZATION OF A DISPLAY IN A VEHICLE

(71) Applicant: Bayerische Motoren Werke Aktiengesellschaft, Munich (DE)

(72) Inventors: Georg Burkhard, Munich (DE); Elisabeth Schmidt, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 17/071,397

(22) Filed: Oct. 15, 2020

(65) Prior Publication Data

US 2021/0110795 A1 Apr. 15, 2021

(30) Foreign Application Priority Data

Oct. 15, 2019 (DE) ...................... 10 2019 127 730.2

(51) Int. Cl.
*G09G 5/38* (2006.01)
*B60K 35/00* (2006.01)
*G08G 1/0967* (2006.01)

(52) U.S. Cl.
CPC .............. *G09G 5/38* (2013.01); *B60K 35/00* (2013.01); *B60K 2370/164* (2019.05); *B60K 2370/166* (2019.05); *B60K 2370/167* (2019.05); *B60K 2370/199* (2019.05); *B60K 2370/52* (2019.05); *G08G 1/096791* (2013.01); *G09G 2320/0252* (2013.01); *G09G 2340/0492* (2013.01); *G09G 2340/14* (2013.01); *G09G 2380/10* (2013.01)

(58) Field of Classification Search
CPC .............. G09G 5/38; G09G 2340/0492; G09G 2380/10; G09G 2340/14; B60K 2370/167; B60K 2370/52; G08G 1/096791
See application file for complete search history.

(56) References Cited

U.S. PATENT DOCUMENTS

| 8,780,174 | B1* | 7/2014 | Rawdon | ............... | H04N 13/211 |
|---|---|---|---|---|---|
| | | | | | 348/43 |
| 10,043,316 | B2 | 8/2018 | Donnelly et al. | | |
| 2008/0054158 | A1* | 3/2008 | Ariyur | ............... | G01S 3/7864 |
| | | | | | 250/203.1 |

(Continued)

FOREIGN PATENT DOCUMENTS

CN 207306187 U * 5/2018
DE 10 2014 221 337 A1 4/2015

OTHER PUBLICATIONS

German-language Office Action issued in German Application No. 10 2019 127 730.2 dated Sep. 7, 2020 (six (6) pages).

*Primary Examiner* — Grace Q Li
(74) *Attorney, Agent, or Firm* — Crowell & Moring LLP

(57) ABSTRACT

A system performs image stabilization of a display in a vehicle, in particular a motor vehicle. The system includes at least one display, in particular a monitor, for visualization; at least one sensor, in particular an acceleration sensor; and a computer unit, in particular an on-board computer. The system is designed to detect, by way of the sensor, a shock to the vehicle, in particular as a result of unevenness of the roadway, and to carry out on the basis thereof, a compensation calculation by use of the computer unit and to output a correction signal to the display, in order to stabilize the visualization on the display.

16 Claims, 3 Drawing Sheets

(56) References Cited

U.S. PATENT DOCUMENTS

| | | | |
|---|---|---|---|
| 2010/0250021 A1* | 9/2010 | Cook | G07C 5/085 |
| | | | 701/1 |
| 2015/0120149 A1 | 4/2015 | Worrel et al. | |
| 2018/0362048 A1* | 12/2018 | Juno | B60R 1/00 |
| 2020/0004341 A1* | 1/2020 | Li | G06F 3/017 |
| 2020/0147383 A1* | 5/2020 | Caban | A61N 1/36031 |
| 2020/0357283 A1* | 11/2020 | Sato | G08G 1/096716 |
| 2021/0009027 A1* | 1/2021 | Mulligan | B60Q 1/143 |

\* cited by examiner

SYSTEM FOR PERFORMING IMAGE STABILIZATION OF A DISPLAY IN A VEHICLE

CROSS REFERENCE TO RELATED APPLICATION

This application claims priority under 35 U.S.C. § 119 from German Patent Application No. 10 2019 127 730.2, filed Oct. 15, 2019, the entire disclosure of which is herein expressly incorporated by reference.

BACKGROUND AND SUMMARY OF THE INVENTION

The invention relates to a system for performing image stabilization, to a vehicle, to a communication system and to a method for performing image stabilization.

As increasing progress has been made with information and entertainment systems in vehicles, for example (autonomous) automobiles, it has clearly become more important for activities which do not relate directly to the driving function to be optimized during travel.

For example, vehicles partly offer large screens for the passengers on the rear seat bench and/or large screens which move or fold out of the inner roof lining as soon as the user would like to use them. Such a screen or monitor can be used, for example, for entertainment purposes during travel. Further monitors or displays also provide a potential driver with information relating to navigation, vehicle data or entertainment.

In many, in particular mechanically attached monitors, which can be moved or folded out, it has been found that when the acceleration changes, the monitor in the vehicle begins to vibrate or to tremble. This generates a disrupted perception of the displayed contents on the part of the vehicle occupants and can cause a driver to be distracted during the manual driving operation.

The invention is therefore based on the object of making available an improved system and method which permit, in particular, the disruption-free perception of the contents on a screen, in particular a monitor by vehicle occupants and/or a driver. The solution is preferably to be capable of being implemented cost-effectively.

This object is achieved by means of a system for performing image stabilization, by a vehicle, by a communication system and by a system for performing image stabilization, according to the claimed invention.

In particular, the object is achieved by a system for performing image stabilization of a display in a vehicle, in particular a motor vehicle, wherein the system has the following:

at least one display, in particular a monitor for visualization;
at least one sensor, in particular an acceleration sensor;
a computer unit, in particular an on-board computer;

wherein the system is designed to detect, by way of the sensor, a shock to the vehicle, in particular as a result of an unevenness of the roadway, and to carry out on the basis thereof, a compensation calculation by way of the computer unit and to output a correction signal to the display, in order to stabilize the visualization on the display.

One concept of the invention is that a movement or an acceleration of the vehicle is measured and the visualization on the display is adjusted or controlled by software in such a way that possibly occurring resulting vibrations of the display are compensated and therefore not perceived by a vehicle occupant.

Acceleration of the vehicle, specifically longitudinal and lateral accelerations can be measured by the one or more sensors, in particular one or more acceleration sensors. The sensors can comprise, for example, sensors which are present in the vehicle and/or additional sensors such as accelerometers and/or gyroscopes. The transmission can be determined from the forces on the display which result from the sensed acceleration, by means of software implemented in the computer unit. These forces can arise both as a result of unevenness of the roadway and natural vibration frequencies, for example, of the bodywork of the vehicle and/or of the display.

In an alternative embodiment, it is possible according to the invention that one or more sensors are mounted directly on the display. The software calculates, if appropriate, which translation or rotation of the visualization on the display is necessary in order to be stabilized in such a way that no vibration at all can be perceived with the visualization on the display by a vehicle occupant. The information which is necessary for this is applied, by the computer unit using a correction signal, e.g. angle indications, translation vectors and/or translation matrices and/or rotation matrices, to the data of the visualization which is to be displayed on the display. This stabilization of the visualization of the display results in a higher level of comfort when using the display during travel. Information can be clearly perceived and can, if appropriate, be taken in more quickly. This can prevent accidents or incorrect operation of the vehicle.

In one embodiment, the vehicle also has at least one communication interface which is designed to exchange information in a wireless fashion with a second vehicle and/or with a corresponding remote device, in particular a server and/or a cloud.

The communication interface permits data to be transmitted and/or received. Received data can be additionally (or else exclusively) used by the computer unit to carry and/or to speed up or make more precise the compensation calculation for the image stabilization.

In one embodiment, the communication interface of the vehicle receives information relating to a vehicle attitude of the second vehicle from the second vehicle, wherein the information relating to the vehicle attitude of the second vehicle is provided with a position indication which corresponds to the current position of the second vehicle.

This ensures that the computer unit will make available at an early time (before measurement by vehicle-internal sensors) location-independent data relating to a condition of the roadway and/or speed profiles and acceleration profiles of the second vehicle, which data and profiles can be used to provide the composition calculation with possible (starting) parameters, in order as a result to minimize a calculation time for the compensation calculation.

In one embodiment, this system operates at least partially predictively, so that measures can be taken simultaneously or before the occurrence of an event, e.g. a shock to the vehicle.

In a further embodiment, the computer unit uses the information relating to the second vehicle attitude of the second vehicle to carry out the compensation calculation at a first point in time $t_1$, in order to output the correction signal when necessary to the display, in order to stabilize the visualization on the display, in particular as soon as the vehicle has reached the position of the corresponding position indication.

This results in the advantage that the compensation calculation by the computer unit can already be started at a relatively early time, that is to say before the vehicle has reached the position at which a shock to the vehicle, corresponding to and/or proportional to a preceding shock to the second vehicle, has occurred, for example, as a result of a condition of the roadway and/or speed profile or acceleration profile for which the visualization on the display is to be stabilized. A time difference between a point in time of the start of the compensation calculation and a point in time of the actual stabilization of the visualization on the display is therefore minimized, wherein the point in time of the actual stabilization is obtained, for example, by correspondingly measuring the (acceleration) sensor. As a result, in particular perceptible deceleration effects are reduced and therefore the perception of the vehicle occupants of the visualization on the display is optimized.

In one preferred embodiment, the communication interface of the vehicle receives and/or uses high-resolution map information, for example about the condition of the roadway, from the remote device, in order to carry out the compensation calculation at a second point in time $t_2$, in order to output the correction signal when necessary to the display, in order to stabilize the visualization on the display. The map information can, however, also be at least partially stored locally.

This also results in the advantage that the compensation calculation by the computer unit can already be started at a relatively early time. The visualization on the display can be stabilized when necessary—that is to say when a previously transmitted position of an unevenness of the roadway is reached. For example, it is also conceivable that additionally transmitted information of the second vehicle and/or of the remote device and/or of the (acceleration) sensor is used for the compensation calculation, in order, in particular, to reduce perceptible deceleration effects and therefore to optimize the perception of the vehicle occupants of the visualization on the display.

In a further embodiment, the computer unit is designed to carry out the compensation calculation on the basis of previously acquired or received information by machine learning at a third point time $t_3$, in order to output the correction signal when necessary to the display, in order to stabilize the visualization on the display.

The use of machining learning, for example by means of an artificial neural network, permits recurring patterns to be detected, stored and when necessary accessed to carry out the compensation calculation. For example, an acceleration signature is conceivable which is caused by a ridge in the ground which is traveled over repeatedly, for example twice a day, by the vehicle. In accordance with a position indication and/or time indication, the computer unit of the vehicle can start the compensation calculation at the third point in time $t_3$, in order to stabilize the visualization on the display when necessary, that is to say for example when traveling over the ridge in the ground. The machine learning provides, on the one hand, the advantage that less data has to be perceived. This is advantageous, for example, in dead spots, such as underground garages. On the other hand, the machine learning can improve the compensation calculation successively by acquiring information in one or more ways as described above, in order ultimately to reduce, in particular, perceptible delay effects, and therefore to optimize the perception of the vehicle occupants of the visualization on the display. The artificial neural network can, however, also be used in one embodiment to predict shocks in a very small time window, e.g. less than 5 seconds or less than 2 seconds. Ultimately shock patterns which occur, e.g. with specific types of road, can be learned. Adaptive neural networks can continuously improve the predictions which are made on the basis of these networks. The network can therefore, for example, also adapt to a change in the driving speed without information about the current speed. Alternatively, the driving speed and/or other parameters can be input values of the artificial neural network.

In a further embodiment, the vehicle furthermore has a detector which is designed to sense a current local condition of the roadway and to analyze it and to carry out on the basis thereof the compensation calculation at a further (fourth) point in time $t_4$, in order to stabilize the visualization on the display when necessary, wherein the detector comprises an optical detector such as a camera and/or infrared camera and/or a LIDAR and/or RADAR system.

A compensatory reaction can also be applied to a local, non-static condition of the roadway, which has not (yet) been sensed by a second vehicle and/or a remote device, by means of optical or spatially resolved detection of the roadway located in the direction of travel. For example, the detector senses objects lying on the roadway, such as stones, branches, snow, sand or the like. The spatial information which is acquired can be correspondingly weighted by the computer unit with respect to a resulting shock to the vehicle. In addition, it is, of course, also possible to sense a ridge in the ground or some other (permanent) unevenness of the roadway in this way by means of the detector or detectors and to give it a corresponding weighting. A previously started and possibly weighted compensation calculation permits, in particular perceptible delay effects to be reduced and therefore the perception of the vehicle occupants of the visualization on the display to be optimized.

In a further embodiment, the compensation calculation takes place in (quasi) real time, in particular with a latency time of 50 ms, preferably 20 ms, more preferably below 20 ms.

The short latency times, that is the time between the sensing of a shock or sensing of a change in the acceleration of the vehicle and sensing of stabilization of the visualization on the display, bring about optimization of the perception of the visualization and avoid smearing effects. In particular, these short latency times are achieved by the methods described above for a preceding compensation calculation, and therefore bring about a high level of comfort when the display is used, since as a result the latency time is reduced to a minimum.

The object mentioned at the beginning is also achieved by vehicle, in particular an autonomously driving vehicle, comprising a system for performing image stabilization according to the above statements.

This also results in corresponding advantages such as have already been described in conjunction with the system.

The object mentioned at the beginning is also achieved by a communication system which is composed of a plurality of vehicles and, in particular of one or more remote devices, in particular a server and/or cloud, wherein the communication system permits information relating to the unevennesses of the roadway or further parameters relating to shocks to be exchanged between the vehicles and/or the remote device.

Corresponding advantages also arise here, such as those which have already been described above in conjunction with the system.

In particular, the object according to the invention is also achieved by a method for performing image stabilization of a display in a vehicle, wherein the method comprises the following steps:

Sensing a shock to the vehicle, in particular as a result of an unevenness of the roadway, by means of at least one vehicle-internal sensor;

Carrying out a compensation calculation by means of a computer unit, in particular onboard-computer, in order to stabilize a visualization on a display;

Displaying a visualization on a display, wherein the orientation of the visualization relative to the shock is corrected.

This also results in corresponding advantages such as have already been described in conjunction with the system.

In one preferred embodiment, the method also comprises a step in which information about an imminent shock to the vehicle is received via a communication interface and/or a further detector of the vehicle, and this information is used for the compensation calculation.

Previously acquired and/or received information makes it possible to carry out the compensation calculation in the method, as it were, in real time with very short latency times, as described above, in order to optimize the stabilized visualization on the display.

In one preferred embodiment, the communication interface of the vehicle transmits information relating to a current vehicle attitude together with a current position indication of the vehicle, in particular when a previously determined value of the vehicle attitude is exceeded, to a remote device and/or a second device.

The information can therefore be collected by the sensors and/or detectors of the vehicle and shared. This permits the stabilization of a display of a second vehicle, in particular of a fleet of vehicles, to be optimized. A previously determined value of the vehicle attitude can be used as a limit, for example a specific magnitude of a shock, for example in g. It is therefore possible to transmit only relevant data or data sets and therefore to limit the flow of data.

The object specified at the beginning is also achieved by computer-readable storage medium which contains instructions which cause a computer unit, in particular an on-board computer of a vehicle, to implement a method, as described above.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
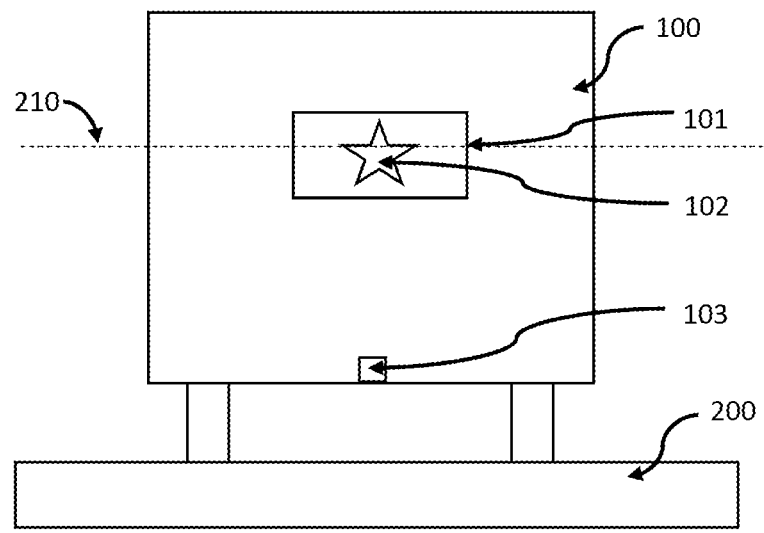
FIG. 1 shows a schematic rear view of a vehicle on a roadway.

FIG. 1 shows a schematic rear view of a vehicle 100 on a roadway 200. A roadway 200 is to be understood essentially as a plane on which the vehicle 100 is located. The vehicle 100 comprises a display 101 on which a visualization 102 is represented. In one embodiment, the display can be a monitor which is attached, for example, to a headrest of a seat or which is attached in such a way that it can, in particular, be extended or folded out from the roof lining of the vehicle. In alternative exemplary embodiments, the display can be foldable or rollable. In addition it is possible to understand the display 101 as being merely a surface, for example a selected surface of the roof lining, or of a window or a windshield, on which the visualization 102 is displayed by means of a projection or hologram. Of course, it is also possible for the vehicle 100 to have a multiplicity of displays 101 of the same type or of different types, in particular a display and/or projection and/or hologram, on which the same or different visualizations 102 are represented. The visualization 102 may be, for example, entertainment content and/or route information or surroundings information and/or vehicle information.

The vehicle 100 also has at least one sensor 103, in particular an acceleration sensor, which is capable of sensing the vehicle attitude. The sensor can comprise, for example, an accelerometer and/or a gyroscope. The sensor 103 is in this respect specifically designed to sense a deviation of the vehicle attitude, for example a deviation of the vehicle attitude from the plane 210. The plane 210 is oriented here, in particular, essentially horizontally. Although FIG. 1 represents a rear view of the vehicle, all the properties of the compensation calculation are to be considered multi-dimensional, in particular the lateral direction and longitudinal direction of the vehicle.

Figure 2:
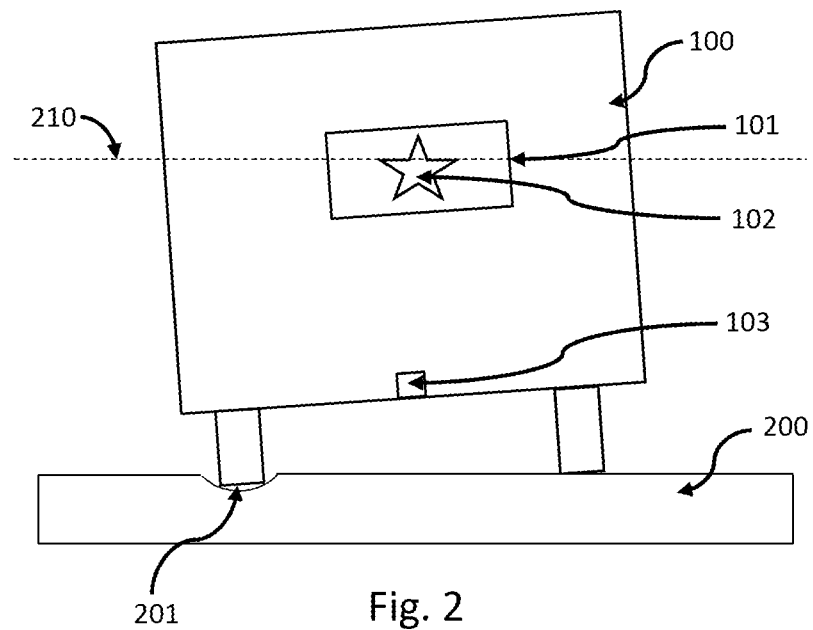
FIG. 2 shows a schematic rear view of a vehicle on a roadway, wherein a vehicle attitude is influenced by a condition of the roadway.

FIG. 2 is a schematic illustration of a situation in which the vehicle attitude of the vehicle 100 deviates, in particular temporarily, from the plane 210 owing to an unevenness 210 of the roadway 200. The sensor 103 can sense this deviation of the vehicle attitude and transmits the measured data to the computer unit of the vehicle. The computer unit calculates an effect of the change in the acceleration of the vehicle 100 on the display and correspondingly how the display 101 moves. According to the invention, the computer unit carries out a compensation calculation on the basis thereof, in order to stabilize the visualization 102 on the display 101.

The computer unit outputs a correction signal according to the compensation calculation to the display 101 in order always to orient the visualization 102 on the display 101, in particular according to the claim 210, that is to say relative to the surroundings of the vehicle. This ensures that the visualization 102 on the display 101 is always perceived in a stable fashion by vehicle occupants. A rapid vibration of the display, for example as a result of natural frequency oscillation at a specific speed and/or acceleration of the vehicle, can therefore be compensated as described.

By means of additional vehicle sensor systems and/or data communication interfaces it is possible to further optimize the inventive image stabilization of the display in the vehicle, specifically with respect to a latency time, in order to improve further the perception of the visualization 102 on the display 101.

Figure 3:
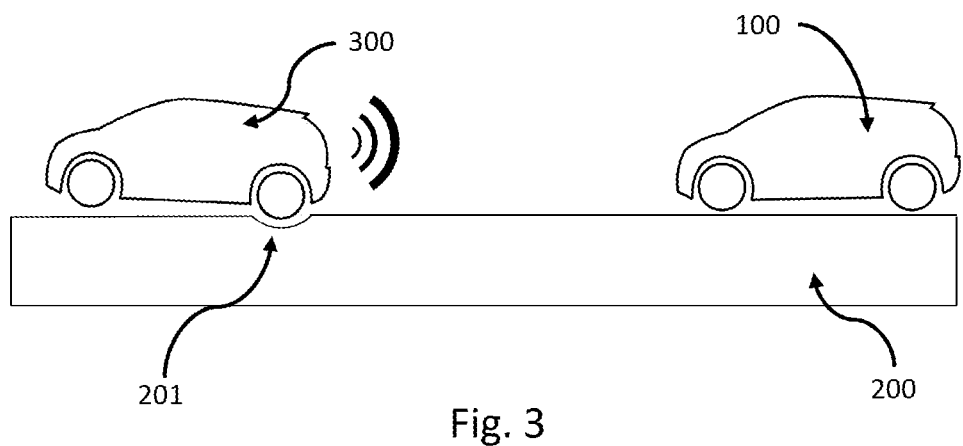
FIG. 3 shows a schematic view of a roadway with a first and a second vehicle, wherein the second vehicle transmits information relating to a condition of the roadway to the first vehicle.

FIG. 3 shows a roadway 200 with a first vehicle 100 and a second vehicle 300. An unevenness 201 of the roadway is sensed according to the invention by a sensor of the second vehicle 300. Via a communication interface of the vehicle 100, the vehicle 100 receives in a wireless fashion information relating to the vehicle attitude of the second vehicle 300, which information is provided with a position indication which corresponds to the current position of the second vehicle 300.

This ensures that the computer unit of the vehicle 100 will make available at an early time, that is to say before sensing of the unevenness 201 of the roadway by the sensor 103 of the vehicle 100, location-dependent data relating to the unevenness 201 of the roadway and/or of speed profiles and acceleration profiles of the second vehicle 300, which data can be used to provide the compensation calculation with possible (starting) parameters, in order as a result to minimize a calculation time for the compensation calculation of the visualization 102 on the display 101 in the vehicle 100 and to execute the compensation calculation at a first point in time $t_1$. The correction signal can then be output, for example, to the display 101 as soon as the sensor 103 detects the unevenness 201 of the roadway at a later point in time and/or as soon as the position of the vehicle 100 corresponds to the position communicated by the second vehicle 300.

Figure 4:
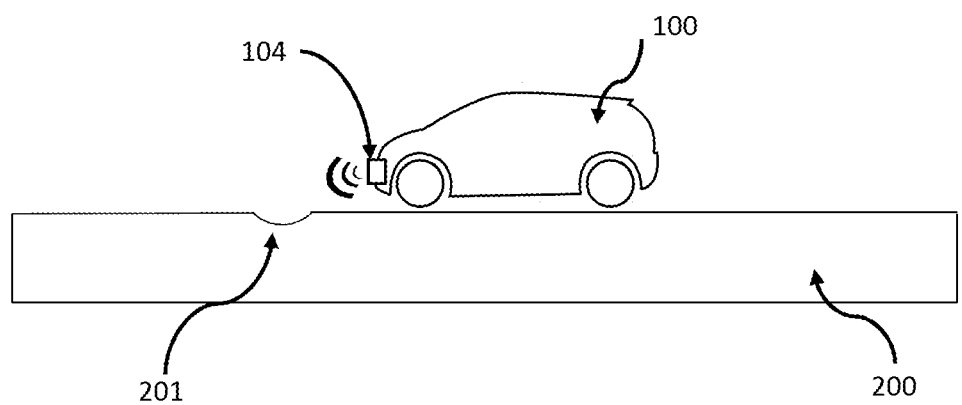
FIG. 4 shows a schematic view of a roadway and of a vehicle which is located thereto, wherein the vehicle acquires information relating to the condition of the roadway by way of an (optical) detector.

FIG. 4 shows a roadway 200 with a vehicle 100. The vehicle 100 comprises an imaging detector 104. In this context, the detector 104 can comprise, for example, an optical detector such as a camera or an infrared camera. In addition it is also conceivable that the detector comprises a RADAR or LIDAR system. Such sensors are installed particularly in autonomously driving vehicles or vehicles with intelligent vehicle assistance. The detector 104 is able to sense an unevenness 201 of the roadway at a point in time before the vehicle 100 has reached the unevenness of the roadway. The computer unit of the vehicle 100 can then analyze and process the information acquired by the detector 104 and provide corresponding parameters for the compensation calculation and carry out the compensation calculation. The correction signal can then be output, for example, to the display 101 as soon as the sensor 103 detects the unevenness 201 of the roadway at a later point in time.

Figure 5:
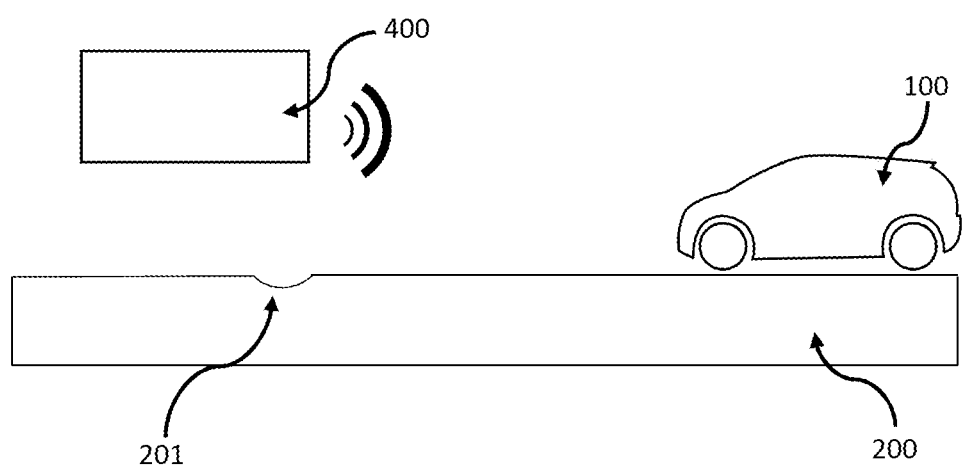
FIG. 5 shows a schematic view of a roadway and of a vehicle located thereon, wherein the vehicle receives information relating to the condition of the roadway from a remote device.

FIG. 5 shows a roadway 200 with a vehicle 100. A remote device 400, for example a server and/or a cloud, transmits high-resolution map information relating to unevennesses 201 on the roadway. This information which is provided by the remote device 400 can be received and/or used by the communication interface, in order to carry out the compensation calculation at a second point in time $t_2$. The correction signal can be output, for example, to the display 101 as soon as the sensor 103 detects an unevenness 201 of the roadway at a later point in time than the second point in time $t_2$, and/or the position of the vehicle 100 corresponds to the position of an unevenness 201 of the roadway which is transmitted by the remote device 400. It is also conceivable here that the high-resolution map information which is provided by the remote device 400 contains map information for navigation of the vehicle 100 and additionally information about unevennesses and/or particular features of the roadway and their position indications. Furthermore, vehicle-specific speed profiles and properties and/or acceleration profiles and properties can also be transmitted by the remote device 400 to the vehicle 100 and used for the compensation calculation. It is conceivable here that the information is vehicle-specific information which is, for example, dependent on the time of year and/or based on new knowledge of the vehicle manufacturer and/or provided within the scope of a software update.

The communication interface of the vehicle 100 is also designed to transmit to the remote device 400 the information and data, which has been and is used for the compensation calculation at a point in time at a position, with an indication of this actual point in time and this actual position of the vehicle 100 as well as other vehicle data such as, for example, the vehicle attitude sensed by the sensor 103, an unevenness of the roadway sensed by the detector 104, or the acceleration/speed of the vehicle, number of vehicle occupants, tire pressure etc.

When necessary, the data and information which is transmitted to the remote device 400 by the vehicle 100 and, if appropriate processed by the remote device 400, for a second vehicle 300 (not illustrated in FIG. 5) is provided in a wireless fashion by the remote device 400, in order to be used for inventive compensation calculation for image stabilization in the second vehicle 300.

Figure 6:
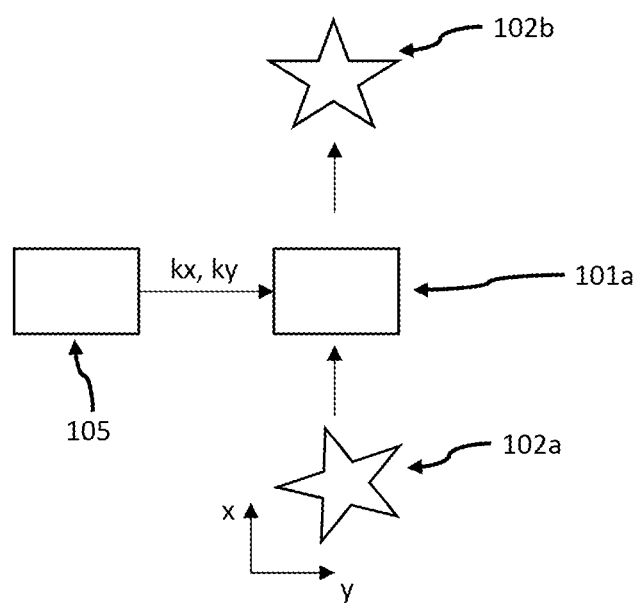
FIG. 6 shows a schematic flow diagram of the image stabilization process.

FIG. 6 shows a schematic flow diagram of the image stabilization according to the invention. As described above, a deviation of the vehicle attitude inevitably brings about a corresponding deviation (relative to areas surrounding the vehicle) of the visualization on a vehicle-internal display, in particular a monitor. By means of a corresponding sensor system it is possible, as described above, to determine a deviation of the vehicle attitude. A (mathematical) model which is implemented on the computer device can calculate, by means of a transmission function, how the deviation of the vehicle attitude enacts on the visualization on the display.

FIG. 6 shows an x-y coordinate system, wherein y corresponds to a horizontal direction of the vehicle and x to a direction which is perpendicular to y. Wherein the horizontal, that is to say the y direction, corresponds essentially to the area surrounding the vehicle—that is to say the direction or orientation on which the visualization is to be stabilized. If the sensor system determines a deviation of the vehicle attitude, this deviation is used by the computer unit 105 to calculate how this deviation of the vehicle attitude acts or will act on the visualization 102*a* on the display.

Corresponding information which is necessary to represent the visualization 102*a* on the display is transmitted by a graphics unit 101*a* of the display 101. If the computer unit then detects that, as a result of a deviation of the vehicle attitude a visualization 102*a* deviates or will deviate from a setpoint position defined by the area surrounding the vehicle, in the x-y coordinate system, the visualization is stabilized by the computer unit 105, as described below.

The computer unit 105 carries out a compensation calculation on the basis of the information which is acquired by means of sensors or detectors and received via a communication interface, as described above in order to transmit a correction signal kx, ky to a graphics unit 101*a* of the display 101. For the compensation calculation it is possible to take into account various information items which are or have been received or determined at various points in time $t_1$, $t_2$, $t_3$, $t_4$. It is also possible that the computer unit comprises an artificial neural network which can access, on the basis of machine learning, information which has been acquired or received earlier, for the compensation calculation.

In the graphics unit 101*a*, the correction signal kx, ky is combined with the corresponding information which is necessary to represent the visualization on the display. This ensures that the graphics unit 101*a* outputs information which has been corrected with respect to the deviation of the vehicle attitude, in particular corrected in a rotatory and/or translational fashion. Therefore, it is ensured according to the invention that the visualization 102*b* on the display 101 is always represented in a stable fashion relative to the area surrounding the vehicle, in order therefore to optimize the perception of the vehicle occupants of the visualization on the display.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SYMBOLS 100 (first) vehicle
101 Display
101a Graphics unit
102 Visualization
102a Data for visualization
102b Corrected data for visualization
103 Sensor
104 Detector
105 Computer unit
200 Roadway
201 Unevenness of the roadway
210 Plane (relative surroundings of the vehicle)
300 Second vehicle
400 Remote device
kx, ky Correction signal

What is claimed is:

1. A system for performing image stabilization of a display in a vehicle, the system comprising:
    at least one display for visualization;
    at least one sensor;
    a computer unit; and
    at least one communication interface which is configured to exchange information in a wireless fashion with a second vehicle and/or with a corresponding remote device, wherein:
    the system is configured to detect, by way of the sensor, a shock to the vehicle,
    the system is further configured to carry out, on the basis of a vehicle attitude of the vehicle caused by the shock to the vehicle, a compensation calculation by way of the computer unit, and to output a correction signal to the display, in order to stabilize the visualization on the display such that the visualization on the display is aligned with respect to a plane that is parallel to a roadway on which the vehicle is traveling,
    the communication interface of the vehicle receives information relating to a second vehicle attitude of the second vehicle from the second vehicle,
    the information relating to the second vehicle attitude of the second vehicle is provided with a position indication which corresponds to a current position of the second vehicle, and
    the computer unit uses the information relating to the second vehicle attitude of the second vehicle to carry out the compensation calculation at a first point in time in order to output the correction signal to the display, in order to stabilize the visualization on the display, as soon as the vehicle has reached the position of the corresponding position indication.

2. The system according to claim 1, wherein the sensor is an acceleration sensor and the computer unit is an on-board computer.

3. The system according to claim 1, wherein the remote device is a server and/or a cloud.

4. The system according to claim 1, wherein the communication interface of the vehicle receives high-resolution map information relating to the condition of the roadway from the remote device and/or use information to carry out the compensation calculation at a second point in time, in order to output the correction signal to the display, in order to stabilize the visualization on the display.

5. The system according to claim 4, wherein the computer unit is further configured to carry out the compensation calculation on the basis of previously acquired or received information by machine learning at a third point in time, in order to output the correction signal to the display, in order to stabilize the visualization on the display.

6. The system according to claim 5, wherein the vehicle also comprises a detector which is configured to sense a current local condition of the roadway and to analyze it and carry out, on the basis thereof, the compensation calculation at a fourth point in time, in order to stabilize the visualization on the display.

7. The system according to claim 6, wherein the detector comprises an optical detector.

8. The system according to claim 7, wherein the optical detector is a camera and/or an infrared camera.

9. The system according to claim 6, wherein the detector comprises a LIDAR and/or RADAR system.

10. The system according to claim 1, wherein the compensation calculation is carried out in real time, with a latency time of 50 ms.

11. A vehicle, comprising a system according to claim 1.

12. The vehicle according to claim 11, wherein the vehicle is an autonomously driving vehicle.

13. A communication system, comprising:
    a plurality of vehicles, each vehicle having a system for performing image stabilization of a display in the vehicle, the system comprising:
        at least one display for visualization;
        at least one sensor;
        a computer unit;
        at least one communication interface which is configured to exchange information in a wireless fashion with a second vehicle and/or with a corresponding remote device;
            wherein the system is configured to detect, by way of the sensor, a shock to the vehicle, and
            wherein the system is further configured to carry out, on the basis of a vehicle attitude of the vehicle caused by the shock to the vehicle, a compensation calculation by way of the computer unit, and to output a correction signal to the display, in order to stabilize the visualization on the display such that the visualization on the display is aligned with respect to a plane that is parallel to a roadway on which the vehicle is traveling; and
        one or more remote devices in a form of a server and/or a cloud, wherein
    the communication system permits information relating to unevennesses of the roadway or further parameters relating to shocks to be exchanged between the plurality of vehicles and/or the one or more remote devices,
    the communication interface of the vehicle receives information relating to a second vehicle attitude of the second vehicle from the second vehicle, the information relating to the second vehicle attitude of the second vehicle is provided with a position indication which corresponds to a current position of the second vehicle, and the computer unit uses the information relating to the second vehicle attitude of the second vehicle to carry out the compensation calculation at a first point in time in order to output the correction signal to the display, in order to stabilize the visualization on the display, as soon as the vehicle has reached the position of the corresponding position indication.

14. A method for performing image stabilization of a display in a vehicle, comprising:

sensing, by way of at least one vehicle-internal sensor, a shock to the vehicle as a result of an unevenness of a roadway on which the vehicle is traveling;

receiving, via a communication interface of the vehicle, information relating to a second vehicle attitude of a second vehicle from the second vehicle, wherein the information relating to the second vehicle attitude of the second vehicle is provided with a position indication which corresponds to a current position of the second vehicle;

carrying out, via an onboard-computer and on the basis of a vehicle attitude of the vehicle caused by the shock to the vehicle, a compensation calculation in order to stabilize a visualization on the display such that the visualization on the display is aligned with respect to a plane that is parallel to the roadway on which the vehicle is traveling, wherein the onboard-computer uses the information relating to a second vehicle attitude of a second vehicle to carry out the compensation calculation at a first point in time in order to output a correction signal to the display, in order to stabilize the visualization on the display, as soon as the vehicle has reached the position of the corresponding position indication; and displaying the visualization on the display.

15. The method according to claim 14, wherein the communication interface of the vehicle transmits information relating to a current vehicle attitude together with a current position indication of the vehicle when a previously determined value of the vehicle attitude is exceeded, to a remote device and/or a second vehicle.

16. A computer product comprising a non-transitory computer-readable medium having stored thereon program code that, when executed, carry out the acts of:

sensing, by way of at least one vehicle-internal sensor, a shock to the vehicle as a result of an unevenness of a roadway on which the vehicle is traveling;

receiving, via a communication interface of the vehicle, information relating to a second vehicle attitude of a second vehicle from the second vehicle, wherein the information relating to the second vehicle attitude of the second vehicle is provided with a position indication which corresponds to a current position of the second vehicle;

carrying out, via an onboard-computer and on the basis of a vehicle attitude of the vehicle caused by the shock to the vehicle, a compensation calculation in order to stabilize a visualization on a display in the vehicle such that the visualization on the display is aligned with respect to a plane that is parallel to the roadway on which the vehicle is traveling, wherein the onboard-computer uses the information relating to a second vehicle attitude of a second vehicle to carry out the compensation calculation at a first point in time in order to output a correction signal to the display, in order to stabilize the visualization on the display, as soon as the vehicle has reached the position of the corresponding position indication; and displaying the visualization on the display.

* * * * *